(12) United States Patent
Kim et al.

(10) Patent No.: US 11,993,203 B1
(45) Date of Patent: May 28, 2024

(54) VEHICULAR LIGHTING DEVICE

(71) Applicant: HYUNDAI MOBIS CO., LTD., Seoul (KR)

(72) Inventors: Do Hyung Kim, Yongin-si (KR); Soon Mo Lee, Yongin-si (KR); Chan Ho Joo, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 18/382,549

(22) Filed: Oct. 23, 2023

(30) Foreign Application Priority Data

Mar. 17, 2023 (KR) .................. 10-2023-0035105

(51) Int. Cl.
| | | |
|---|---|---|
| *B60Q 1/26* | (2006.01) | |
| *B60Q 1/00* | (2006.01) | |
| *B62D 25/18* | (2006.01) | |
| *B62D 37/02* | (2006.01) | |
| *F21S 41/39* | (2018.01) | |

(52) U.S. Cl.
CPC ......... *B60Q 1/2653* (2013.01); *B60Q 1/0035* (2013.01); *B62D 25/182* (2013.01); *B62D 37/02* (2013.01); *F21S 41/39* (2018.01)

(58) Field of Classification Search
CPC ..... B60Q 1/2653; B60Q 1/0035; F21S 41/39; B62D 37/02; B62D 25/182
See application file for complete search history.

(56) References Cited

U.S. PATENT DOCUMENTS

| | | | | |
|---|---|---|---|---|
| 8,646,552 | B2* | 2/2014 | Evans ..................... | B60R 19/12 180/68.1 |
| 8,892,314 | B2* | 11/2014 | Charnesky ............... | F01P 7/04 180/68.1 |
| 8,919,470 | B2* | 12/2014 | Hori ..................... | B60K 11/085 180/68.1 |
| 8,936,121 | B2* | 1/2015 | Vacca ................... | B60K 11/04 165/44 |
| 8,998,293 | B2* | 4/2015 | Glickman ............ | B62D 35/005 296/180.1 |
| 9,233,605 | B2* | 1/2016 | Hijikata ............... | B60K 11/085 |
| 2011/0097984 | A1* | 4/2011 | Hasegawa ........... | B60K 11/085 454/152 |

FOREIGN PATENT DOCUMENTS

KR 10-2022-0014929 A 2/2022

* cited by examiner

*Primary Examiner* — Bryon T Gyllstrom
(74) *Attorney, Agent, or Firm* — Morgan, Lewis & Bockius LLP

(57) ABSTRACT

The present disclosure relates to a vehicular lighting device, the vehicular lighting device including a duct provided in a front bumper in such a manner as to be positioned in front of a front wheel, an opening and closing unit rotatably coupled to the front bumper in such a manner as to open and close the duct, a lamp installed inside the duct in such a manner as to be positioned behind the opening and closing unit, and a reflector installed inside the duct and reflecting light, emitted by the lamp, toward the opening and closing unit.

12 Claims, 7 Drawing Sheets

VEHICULAR LIGHTING DEVICE

CROSS-REFERENCE TO RELATED APPLICATION

This application claims the benefit of priority under 35 USC § 119(a) to Korean Patent Applications No. 10-2023-0035105, filed on Mar. 17, 2023, the entire disclosure of which is incorporated herein by reference for all purposes.

TECHNICAL FIELD

Exemplary embodiments relate to a vehicular lighting device and, more particularly, to a vehicular lighting device capable of providing visual information to a driver, a nearby vehicle, and a pedestrian through a vehicular air trap.

BACKGROUND

Extensive research has been actively conducted on improving fuel efficiency of vehicles to comply with increasingly stringent emission regulations. Various techniques of decreasing an aerodynamic force have been applied to improve the fuel efficiency. Installing a wheel air curtain on a front bumper of the vehicle is a technique of reducing air flow around a wheel house.

Usually, for the wheel air curtain, an air inlet port is formed in each of both sides of the front bumper, and an air outlet port is formed in a rear surface of the wheel house. However, in the related art, there is a problem in that the wheel air curtain cannot be open and closed or that an amount of air flowing through the wheel air curtain can be adjusted. In the related art, an air flap is installed on the wheel air curtain to open or close the wheel air curtain, aiming to address this problem. However, this solution introduces another problem: the inability to recognize the state of operation of the air flap from the outside, especially at night. Therefore, there is a need to find a solution to this problem.

The related art of the present disclosure is disclosed in Korean Patent Application Publication No. 10-2022-0014929 (published on Feb. 8, 2022 and entitled "APPARATUS FOR DISPLAYING INFORMATION OF VEHICLE AND CONTROL METHOD THEREOF").

SUMMARY

Various embodiments, which are contrived to find a solution to the above-mentioned problem, are directed to a vehicular lighting device capable of providing visual information to a driver, a nearby vehicle, and a pedestrian through an air trap installed on a vehicular wheel air curtain.

In order to accomplish the above-mentioned objects, in an embodiment, a vehicular lighting device includes: a duct disposed in a front bumper and positioned in front of a front wheel; an opening and closing unit rotatably coupled to the front bumper and configured to open or close the duct; a lamp installed inside the duct and positioned behind the opening and closing unit; and a reflector inside the duct and reflecting light, emitted by the lamp, toward the opening and closing unit.

The duct may include: a first opening open in front of the front bumper; a second opening opens in front of the front wheel; and a channel disposed between the first opening and the second opening such that the first opening and the second opening communicate with each other to guide flow of air.

The opening and closing unit may open or close the first opening.

The opening and closing unit may be configured such that a degree of opening of the first opening is adjustable.

The opening and closing unit may adjust the degree of opening of the first opening according to a traveling mode of a vehicle.

The opening and closing unit may be rotatable toward a rear of the front bumper to open the first opening.

The opening and closing unit may include a plurality of flaps arranged in a row along a widthwise direction of the front bumper.

The plurality of flaps may be rotatably coupled to each other.

The plurality of flaps may be slidably coupled to each other such that a distance between each of the plurality of flaps is adjustable.

The lamp may be configured to emit a pattern of light toward the reflector.

The pattern of light that is reflected by the reflector may be emitted to outer surfaces of the plurality of flaps.

The reflector may be arranged to face the lamp.

According to the present invention, the opening and closing unit is configured to adjust an amount of air flowing through the duct formed in the front bumper. With this configuration, a vortex that is formed around the front wheel can be reduced, thereby decreasing an aerodynamic force that the vehicle experiences. Thus, the effect of increasing the number of miles that the vehicle travels can be achieved.

In addition, the pattern of light that is emitted by the lamp is reflected by the reflector and is emitted to a surface of the opening and closing unit that is movable. Thus, the effect of varying an image of lighting according to the traveling mode of the vehicle can be achieved.

DETAILED DESCRIPTION

Figure 1:
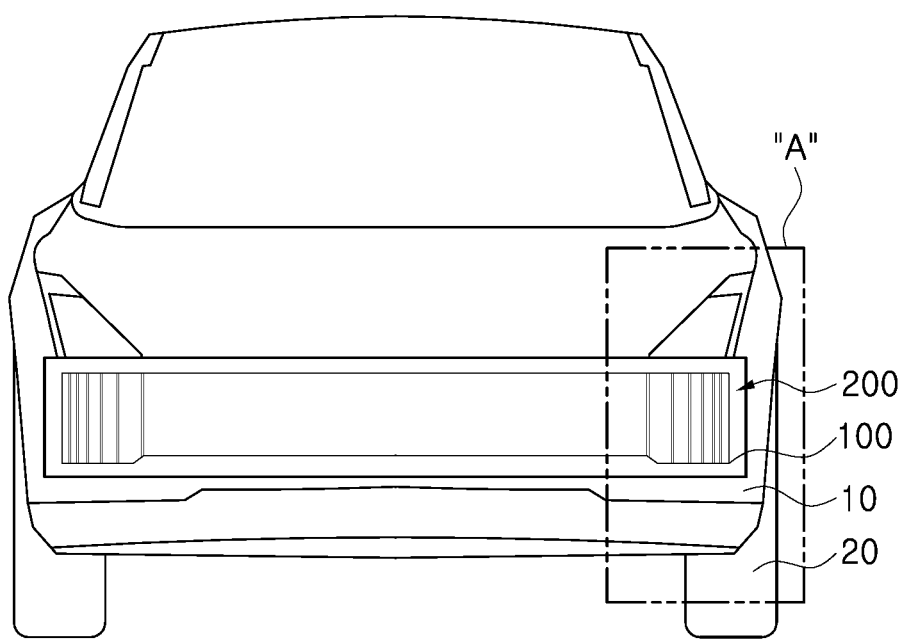
FIG. 1 is a front view illustrating a state where a duct is closed by an opening and closing unit according to an embodiment of the present disclosure, when viewed from the front of a vehicle.

A vehicular lighting device according to an embodiment of the present disclosure will be described below with reference to the accompanying drawings. For clarity and convenience in description, thicknesses of lines, sizes of constituent elements, and the like may be illustrated in a non-exact proportion in the drawings. In addition, terms that hereinafter refer to constituent elements, respectively, according to the present disclosure are defined by considering their respective functions and may vary according to a user's or manager's intention or to practices in the art.

Therefore, these terms should be contextually defined in light of the present specification.

Figure 2:
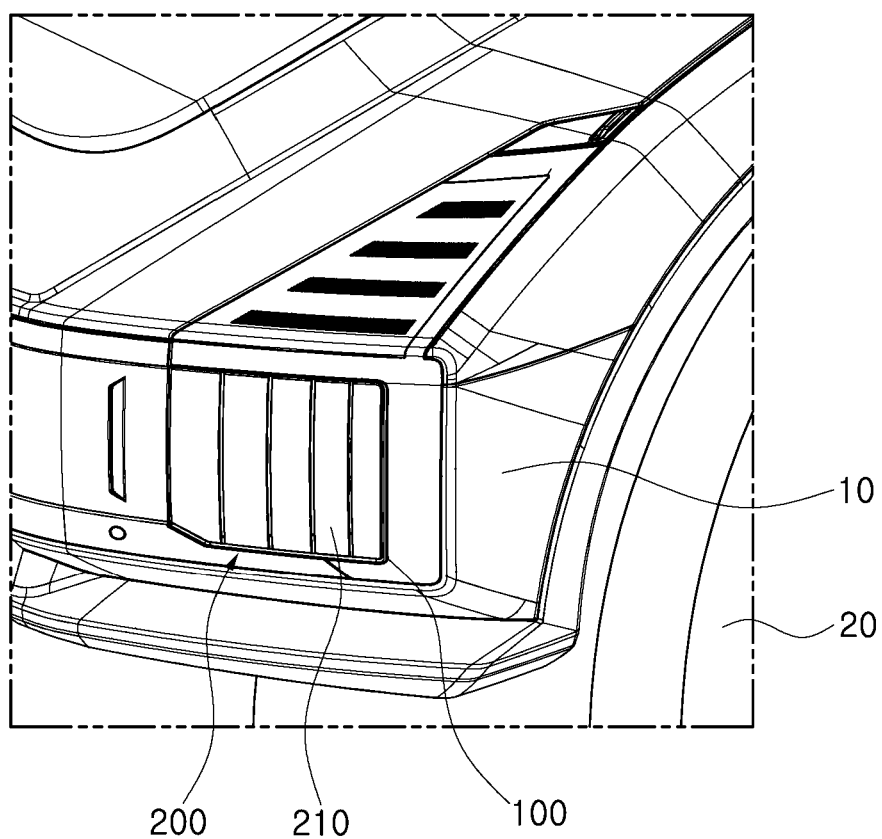
FIG. 2 is an enlarged perspective view illustrating a rectangular portion "A," indicated with a dash-double dotted line in FIG. 1.
Figure 3:
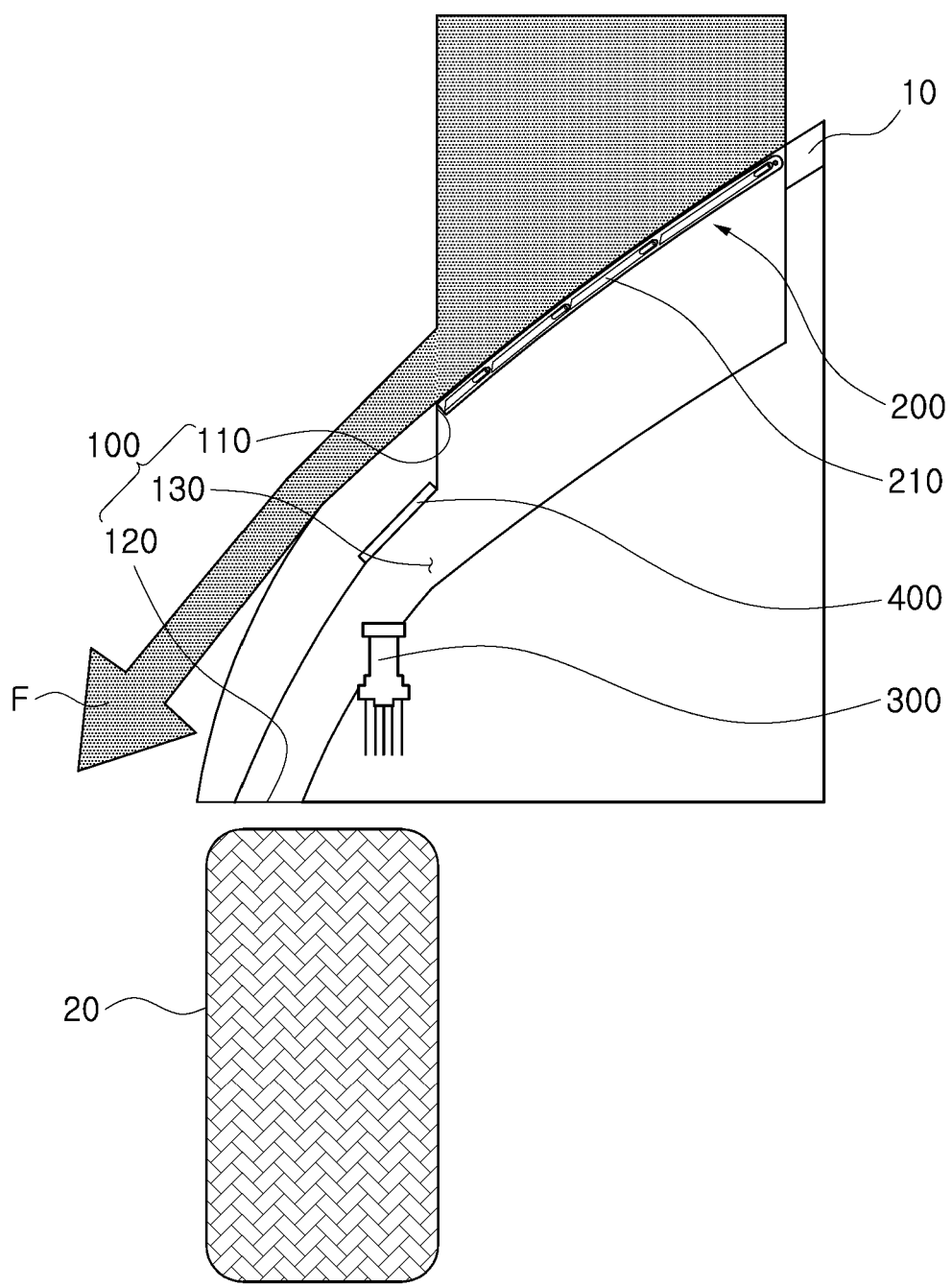
FIG. 3 is a cross-sectional view of FIG. 2.
Figure 4:
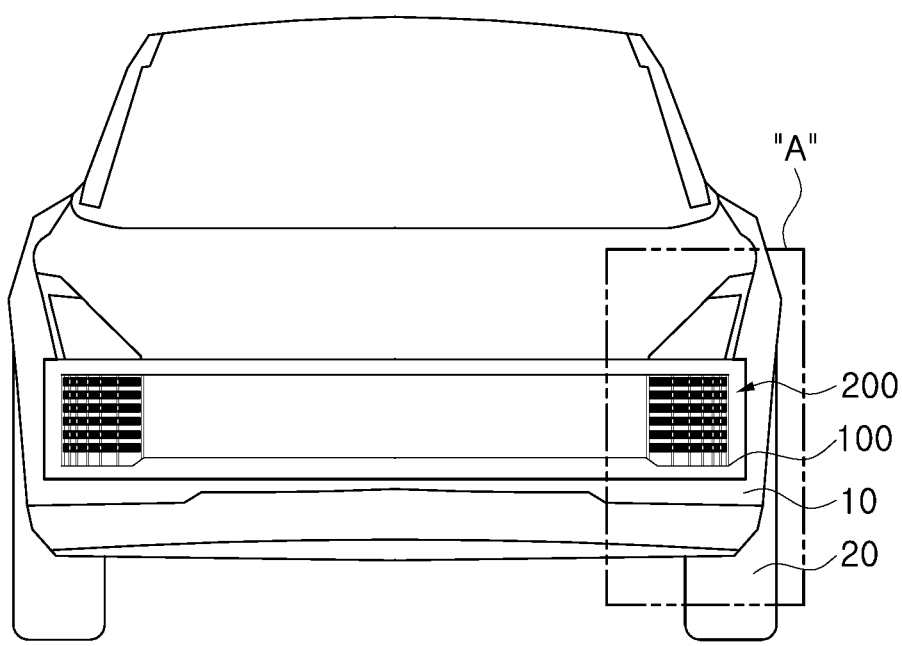
FIGS. 4 and 5 are front views each illustrating a state where, in the lighting device according to the embodiment of the present disclosure, the opening and closing unit opens the duct, when viewed from the front of the vehicle.
Figure 5:
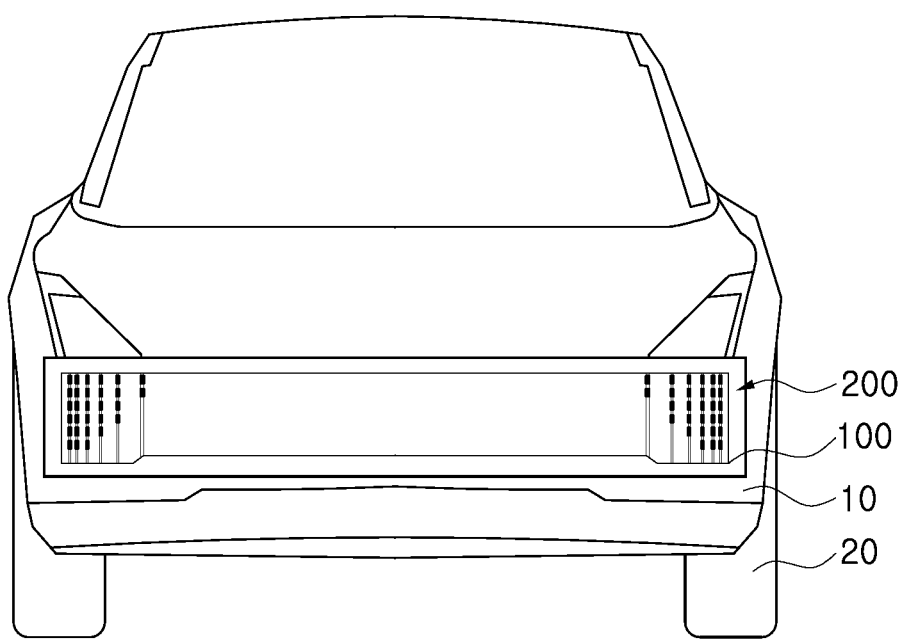
Figure 6:
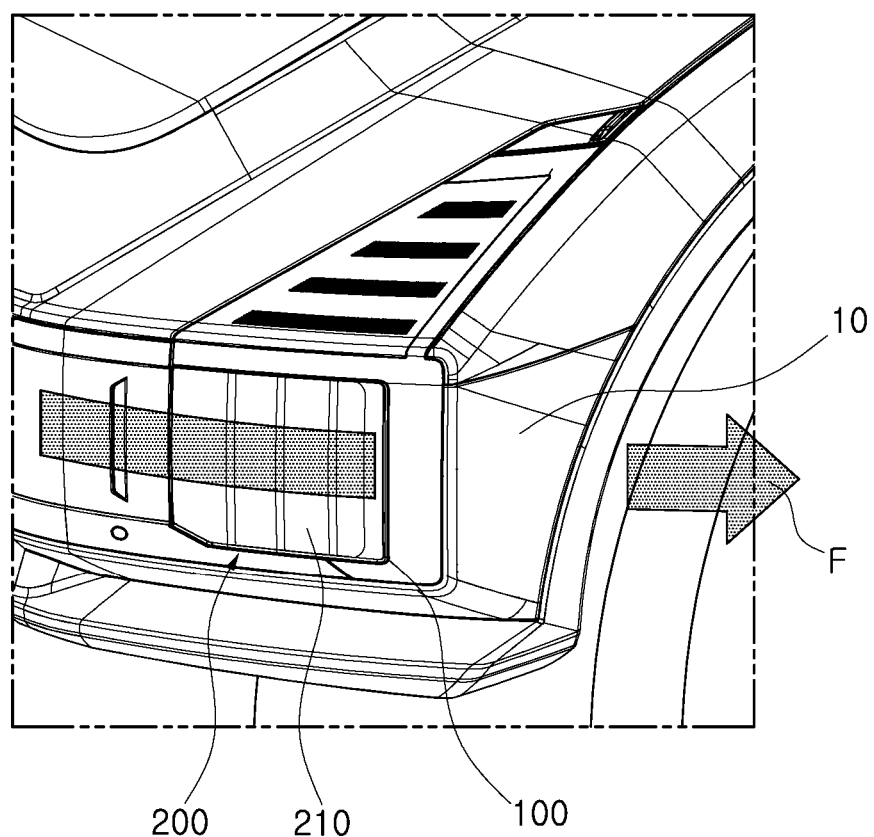
FIG. 6 is an enlarged perspective view illustrating a rectangular portion "A," indicated with a dash-double dotted line in FIG. 4.
Figure 7:
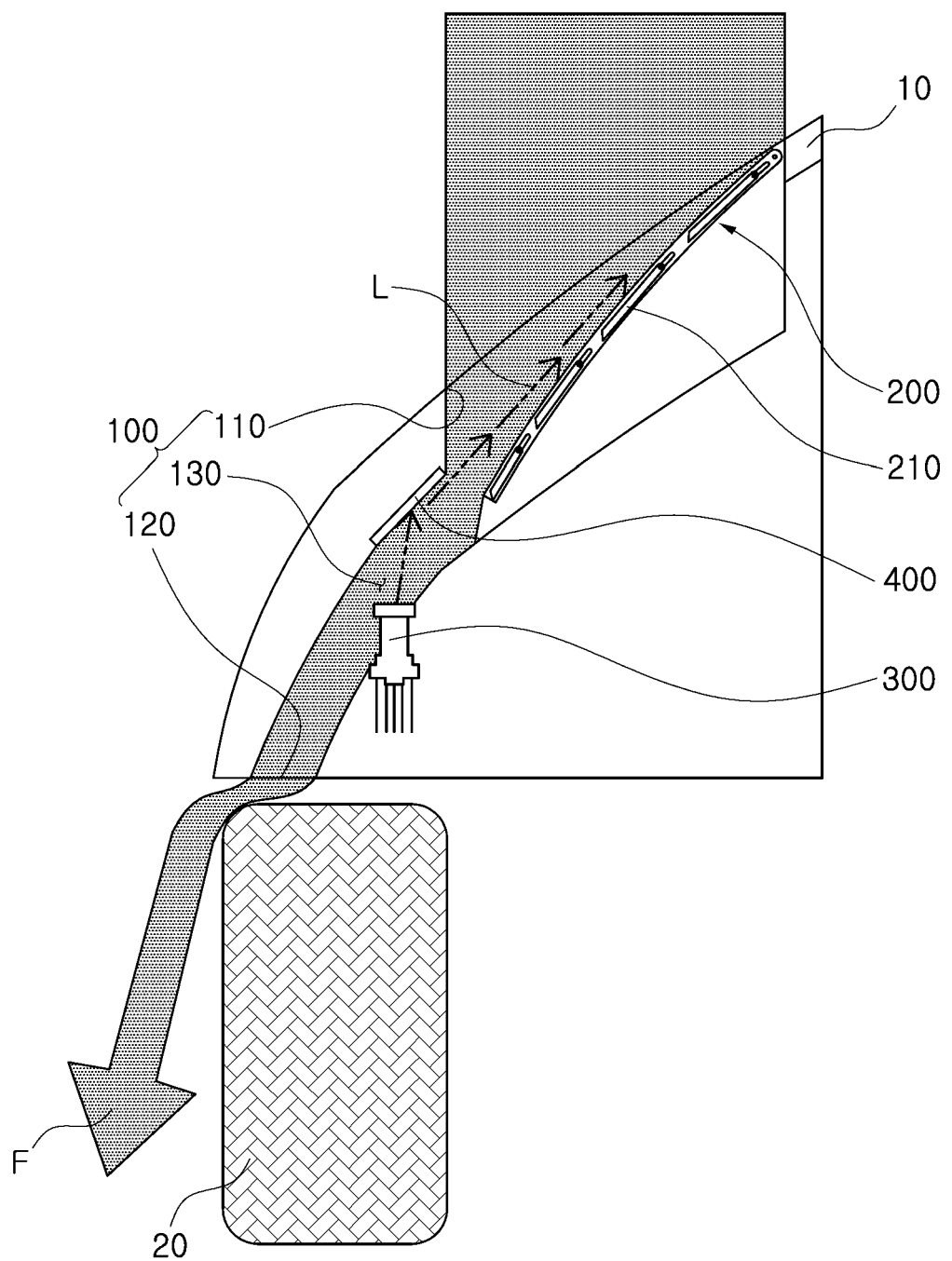
FIG. 7 is a cross-sectional view of FIG. 6.

FIG. 1 is a front view illustrating a state where a duct 100 is closed by an opening and closing unit 200 according to the embodiment of the present disclosure, when viewed from the front of a vehicle. FIG. 2 is an enlarged perspective view illustrating a rectangular portion "A," indicated with a dash-double dotted line in FIG. 1. FIG. 3 is a cross-sectional view of FIG. 2. FIGS. 4 and 5 are front views each illustrating a state where, in the lighting device according to the embodiment of the present disclosure, the opening and closing unit 200 opens the duct 100, when viewed from the front of the vehicle. FIG. 6 is an enlarged perspective view illustrating a rectangular portion "A," indicated with a dash-double dotted line in FIG. 4. FIG. 7 is a cross-sectional view of FIG. 6.

With reference to FIGS. 1 to 7, the vehicular lighting device according to the embodiment of the present disclosure that includes the duct 100, the opening and closing unit 200, a lamp 300, and a reflector 400 will be described in detail as follows.

The duct 100 is provided in the front bumper 10 of the vehicle. The duct 100 may be arranged on each of both sides (the left and right sides of FIG. 1) of the front bumper 10. The duct 100 is positioned on the front side (the upper side of FIG. 3) of the front wheel 20. The duct 100 may decrease an aerodynamic force that the vehicle experiences by reducing a vortex that occurs around the front wheel 20 while the vehicle travels. This decrease can improve fuel efficiency (electricity efficiency), thereby increasing the number of miles that the vehicle travels.

The duct 100 may include a first opening 110, a second opening 120, and a channel 130.

The first opening 110 may be formed in an outer surface of the front bumper 10 in a manner that is open in front of the front bumper 10. Through the first opening 110, outside air is introduced.

The second opening 120 is formed in an inner surface of the front bumper 10 in a manner that is positioned behind the first opening 110 and opens in front of the front wheel 20. The outside air that is introduced through the first opening 110 is discharged inward with respect to a wheel house through the second opening 120.

The channel 130 is a passage that connects between the first opening 110 and the second opening 120 in such a manner as to be open into each other. The channel 130 guides flow of air that is introduced through the first opening 110 and is discharged through the second opening 120. The channel 130 is provided between the first opening 110 and the second opening 120.

The opening and closing unit 200 opens and closes the duct 100 and is coupled to the front bumper 10. A one-side end portion of the opening and closing unit 200 may be rotatably coupled to the front bumper 10 with a hinge unit in between. The opening and closing unit 200 may be a hinge-type door.

The opening and closing unit 200 may be installed to the side of the first opening 110. With a control signal that is generated by a control unit of the vehicle according to a traveling mode of the vehicle, the opening and closing unit 200 may open the first opening 110 in such a manner as to introduce air through the first opening 110, and may close the first opening 110 in such a manner as to block air from being introduced. The opening and closing unit 200 may rotate toward the rear of the front bumper 10 may open the first opening 110.

An arrow marked with F in FIG. 3 indicates a direction in which air flows when the opening and closing unit 200 closes the first opening 110. Arrows marked with F in FIGS. 6 and 7 indicate a direction in which the opening and closing unit 200 opens the first opening 110.

In addition, the opening and closing unit 200 may be provided in such a manner that a degree of opening of the first opening 110 is adjustable with a control signal that is generated by the control unit of the vehicle according to the traveling mode of the vehicle. In other words, the opening and closing unit 200 may operate in such a manner that an amount of air flowing through the channel 130 is adjusted by varying the degree of opening of the first opening 110.

The opening and closing unit 200 may include a flap 210. A plurality of flaps 210 may be provided to be arranged in a row along the widthwise direction of the front bumper 10. The plurality of flaps 210 may be rotatably coupled to each other. In other words, end portions, facing each other, of the flaps 210 may be rotatably coupled to each other with a hinge unit in between.

As another implementation example, the plurality of flaps 210 may be coupled to each other in such a manner that a distance between each of the plurality of flaps is adjustable. In other words, the plurality of flaps 210 may be slidably coupled to each other in such a manner that the distance between each of the plurality of flaps is adjustable.

The opening and closing unit 200 including the plurality of flaps 210 may open the first opening 110 by rotating obliquely or in a bent manner at a setting angle toward the rear of the front bumper 10.

The lamp 300 may be installed inside the duct 100. In other words, the lamp 300 may be coupled to an inner surface of the front bumper 10. The lamp 300 may be arranged between the first opening 110 and the second opening 120 in a manner that is positioned behind the opening and closing unit 200. The lamp 300 may be positioned behind the opening and closing unit 200, but in a sideways direction. The lamp 300 may emit various patterns of light toward in front of the front bumper 10.

The reflector 400 is installed inside the duct 100. In other words, the reflector 400 may be coupled to the inner surface of the front bumper 10 in a manner that is oblique at a setting angle. The reflector 400 may be arranged to be positioned between the first opening 110 and the second opening 120 in a manner that faces the lamp 300.

The reflector 400 reflects light emitted by the lamp 300 toward the opening and closing unit 200. In other words, the reflector 400 may reflect various patterns of light, which is emitted by the lamp 300, to the opening and closing unit 200. The reflector 400 may be a flat mirror or lens or concave or convex mirror or lens.

When the first opening 110 is open by rotation of the opening and closing unit 200, a pattern of light that is emitted by the lamp 300 is reflected by the reflector 400 and is emitted to an outer surface of the opening and closing unit 200. In other words, the pattern of light that is reflected by the reflector 400 is emitted toward a front surface of the flap 210 of the opening and closing unit 200 that faces toward the front bumper 10. Various patterns of light that is emitted to the front surface of the flap 210 of the opening and closing unit 200 may be recognized in front of the vehicle or may be recognized in front of vehicle but in a sideways direction. An arrow marked with L in FIG. 7 indicates a direction in which light is emitted by the lamp 300 and is reflected by the reflector 400.

At this point, since the opening and closing unit 200 that opens and closes the duct 100 is movable instead of being stationary, an image of the pattern of light that is emitted toward the opening and closing unit 200 may be transformed and distorted in various shapes.

In the vehicular lighting device according to the embodiment of the present disclosure, the opening and closing unit 200 is configured to adjust an amount of air flowing through the duct 100 formed in the front bumper 10. With this configuration, the vortex that is formed around the front wheel 20 can be reduced, thereby decreasing the aerodynamic force that the vehicle experiences and thus increasing the number of miles that the vehicle travels.

In the vehicular lighting device according to the embodiment of the present disclosure, the pattern of light that is emitted by the lamp 300 is reflected by the reflector 400 and is emitted to a surface of the opening and closing unit 200 that is movable. Thus, an image of lighting may vary according to the traveling mode of the vehicle.

The embodiment of the present disclosure is described only in an exemplary manner with reference to the drawings. It would be understandable to a person of ordinary skill in the art to which the present disclosure pertains that various modifications may possibly be made to the embodiment and that various equivalents thereof may possibly be implemented. Therefore, the legitimate technical scope of the present disclosure should be defined by the following claims.

What is claimed is:

1. A vehicular lighting device comprising:
    a duct disposed in a front bumper and positioned in front of a front wheel;
    an opening and closing unit rotatably coupled to the front bumper and configured to open or close the duct;
    a lamp installed inside the duct and positioned behind the opening and closing unit; and
    a reflector installed inside the duct and reflecting light, emitted by the lamp, toward the opening and closing unit.

2. The vehicular lighting device of claim 1, wherein the duct comprises:
    a first opening that is open in front of the front bumper;
    a second opening that is open in front of the front wheel; and
    a channel disposed between the first opening and the second opening such that the first opening and the second opening communicate with each other to guide flow of air.

3. The vehicular lighting device of claim 2, wherein the opening and closing unit opens or closes the first opening.

4. The vehicular lighting device of claim 3, wherein the opening and closing unit is configured such that a degree of opening of the first opening is adjustable.

5. The vehicular lighting device of claim 4, wherein the opening and closing unit adjusts the degree of opening of the first opening according to a traveling mode of a vehicle.

6. The vehicular lighting device of claim 3, wherein the opening and closing unit is rotatable toward a rear of the front bumper to open the first opening.

7. The vehicular lighting device of claim 1, wherein the opening and closing unit comprises:
    a plurality of flaps arranged in a row along a widthwise direction of the front bumper.

8. The vehicular lighting device of claim 7, wherein the plurality of flaps are rotatably coupled to each other.

9. The vehicular lighting device of claim 8, wherein the plurality of flaps are slidably coupled to each other such that a distance between each of the plurality of flaps is adjustable.

10. The vehicular lighting device of claim 7, wherein the lamp is configured to emit a pattern of light toward the reflector.

11. The vehicular lighting device of claim 10, wherein the pattern of light that is reflected by the reflector is emitted to outer surfaces of the plurality of flaps.

12. The vehicular lighting device of claim 1, wherein the reflector is arranged to face the lamp.

\* \* \* \* \*